June 15, 1937.  W. E. MOORE ET AL  2,083,732
ADSORBENT APPARATUS
Original Filed Nov. 22, 1932  4 Sheets-Sheet 1

William E. Moore,
George L. Simpson
Inventors

By Wm. L. Symons
Attorney

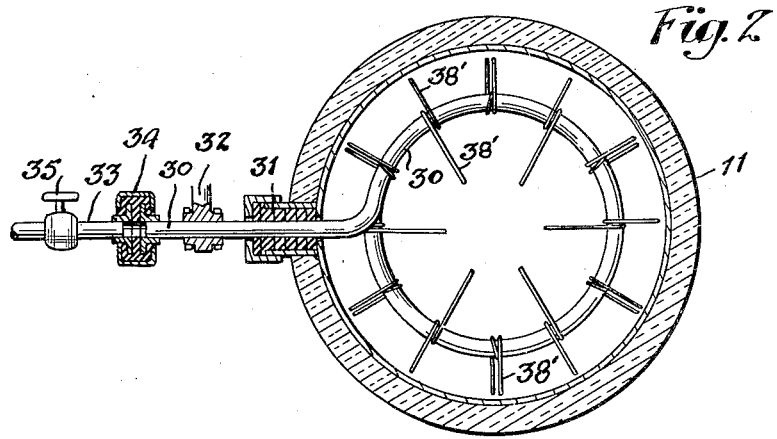
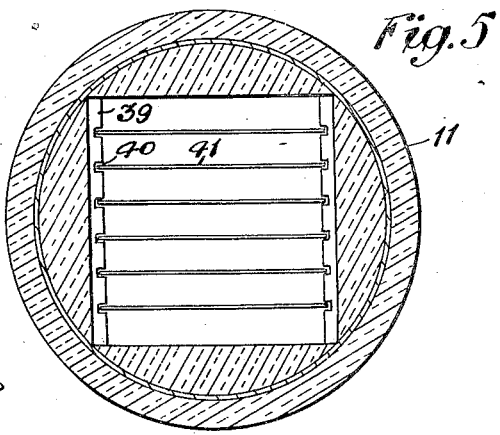
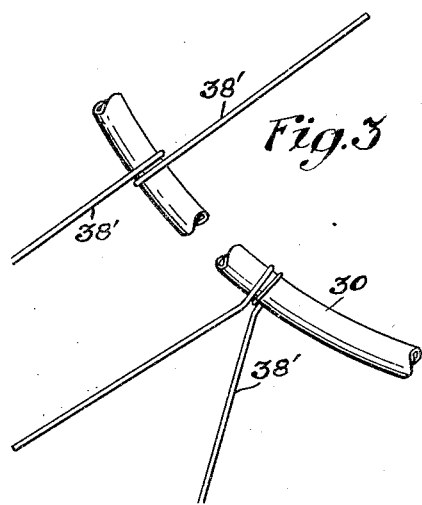

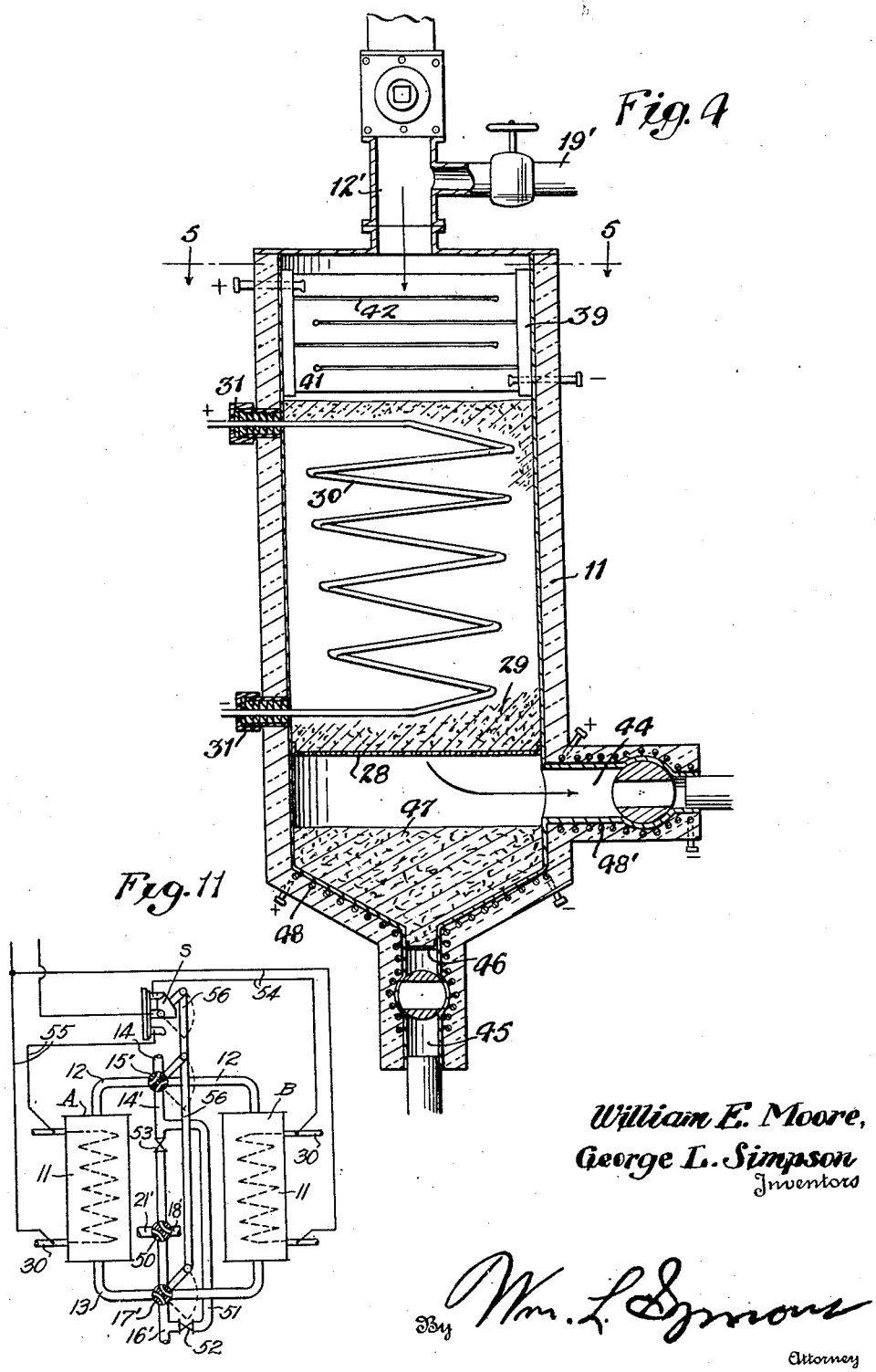

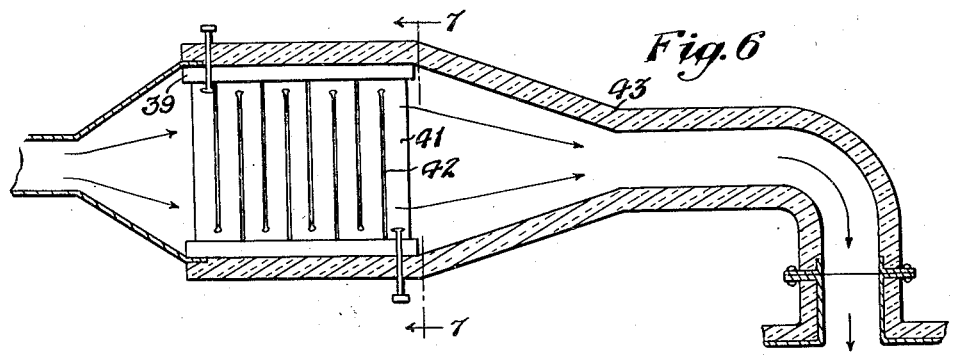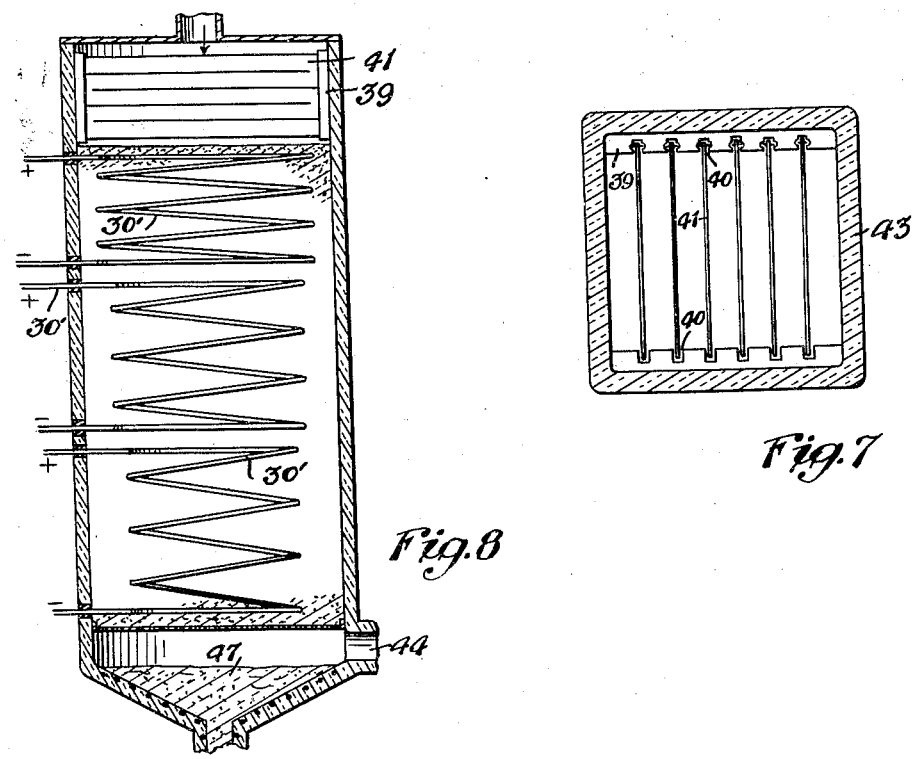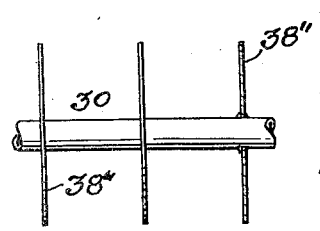

Patented June 15, 1937

2,083,732

UNITED STATES PATENT OFFICE 2,083,732

ADSORBENT APPARATUS

William E. Moore, Pittsburgh, and George L. Simpson, Coraopolis, Pa., assignors to Pittsburgh Research Corporation, Pittsburgh, Pa.

Original application November 22, 1932, Serial No. 643,940. Divided and this application March 3, 1936, Serial No. 66,948

21 Claims. (Cl. 183—4)

Our invention relates to improvements in apparatus for using adsorbents and more particularly to an apparatus for using solid adsorbent material.

To remove moisture or gas from air and gases for various technical and industrial uses, solid adsorbents such as activated alumina, adsorbent gels and the like are used. When the adsorbent material has extracted a certain percentage of their total weight of moisture or gas, it can remove no more moisture or gas until it has been reactivated. The reactivation process consists in driving off the moisture or gas which has been adsorbed.

Heretofore this reactivation has been accomplished by passing heated air through the adsorbent material; by heating the adsorbent with the hot gases from gas burners or the like, or by surrounding the container with a chamber containing high temperature steam. Experience has shown these methods of reactivation to be unsatisfactory.

An important object of our invention is to provide a novel apparatus for removing moisture or gas from gases or the like and to reactivate the adsorbent material after the adsorbing step.

Other objects and advantages of our invention will be apparent during the course of the following description.

This application is a division of our co-pending application 643,940 filed November 22, 1932 for Apparatus for using adsorbents.

Figure 1:
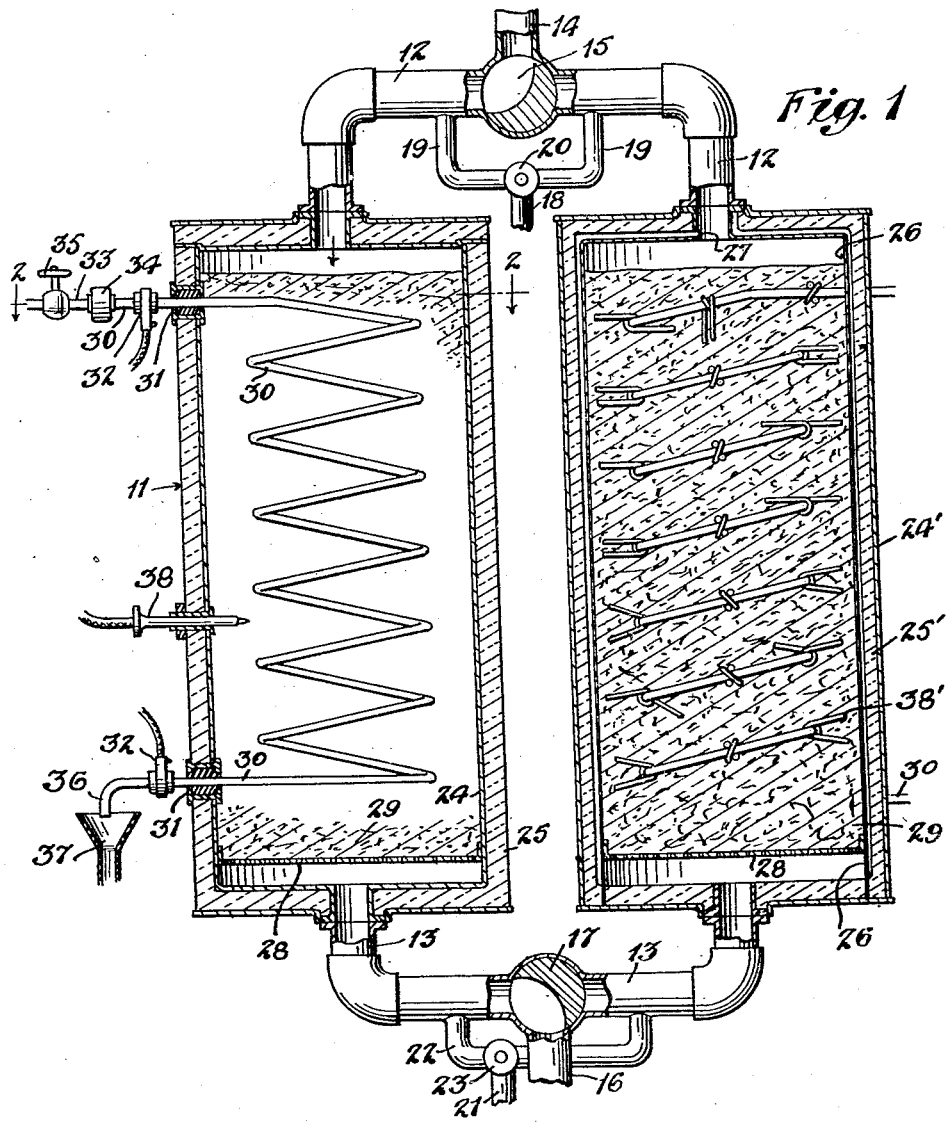

In the accompanying drawings which form a part of this specification and wherein like characters of reference denote like parts throughout, Figure 1 is a vertical sectional view through an adsorbent apparatus embodying our invention, Figure 2 is a horizontal sectional view on line 2—2 thereof, Figure 3 is a detail view of a portion of the heater element showing the position of the radiating spines thereon, Figure 4 is a central vertical sectional view of a modified form of our invention, Figure 5 is a horizontal section taken on line 5—5 thereof, Figure 6 is a longitudinal sectional view of an air or gas heater for use with our adsorbent apparatus.

Figure 10:
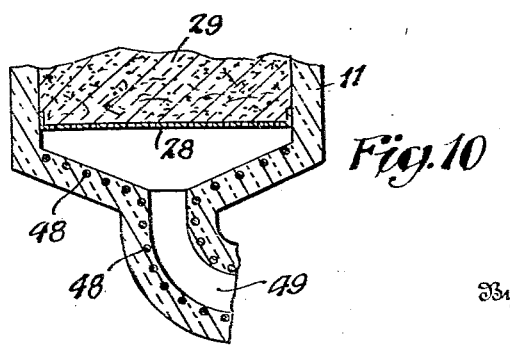

Figure 7 is a transverse section on line 7—7 of Figure 6,

Figure 8 is a sectional view of a further modification of our adsorbent apparatus, Figure 9 is a detail of the heater element having a modified form of radiating member, Figure 10 is a detail sectional view of a modification of the discharge end of our adsorbent apparatus, and, Figure 11 is a diagrammatic view illustrating the valve arrangement for controlling the gas circulation, and the interconnection between the main control valves and the electric switch for controlling the heating means.

In the drawings, wherein for the purpose of illustration is shown a preferred embodiment of our invention, the numeral 11 designates the towers of a dual adsorbent unit connected at their tops by gas inlet pipes 12, and at their lower ends by gas outlet pipes 13. A supply pipe 14 is connected to the inlet pipes 12 by means of a three way valve 15 while a discharge pipe 16 is connected to the outlet pipes 13 by means of a three way valve 17. By means of valves 15 and 17 the pipes 14 and 16 may be connected to the left hand tower, as in Figure 1 or to the right hand tower, or completely shut off from both towers.

A wash gas supply pipe 18 is connected to each of pipes 12 by branches 19 which straddle valve 15 and is provided with a three way valve 20 to connect pipe 18 with either of the towers 11. A wash gas discharge pipe 21 is connected to pipes 13 by means of branches 22 which straddle valve 17, and a three way valve 23 is arranged to control the flow of wash gas from the towers.

The towers 11 may be of any suitable construction. At the left of Figure 1, we have shown a tower formed from a metallic casing 24 surrounded by refractory heat insulating material 25. The top of the tower may be removable if desired. This arrangement permits contact of the metal casing with the heated adsorbent material and therefore increases the length of time and amount of power required to reactivate the adsorbent material. It is preferred therefore to use the construction shown at the right of Figure 1, in which the metal casing 24' is lined with heat insulating material 25'. A very thin walled metal container 26 is arranged inside of the heat insulating material. In this construction it is only necessary to heat these very thin metal walls to the temperature of reactivation, and not the heavy outer casing. Where the apparatus is operated at high pressures, a bleeder port 27 allows the pressure to equalize on both sides of the container. The outer casing supplies the mechanical strength, and the thin inner walls are subjected only to balanced pressures. The space between the inner metal walls 26 and the insulating lining 25' is exaggerated in Figure 1 to illustrate this balancing of pressures on both sides of the container 26.

While two forms of towers are illustrated in Figure 1, it is obvious that only one construction will be used in practice in a single unit, preferably the form shown at the right of Figure 1.

A perforated plate 28 extends completely across the lower end of each tower at a point spaced a short distance from the bottom of the tower and serves as a support for the adsorbent material 29 which may be activated alumina or other suitable material. The adsorbent material extends from the plate 28 to a point spaced a short distance below the top of the tower.

The heating element preferably comprises a metallic resistance element arranged in zig-zag formation, loops or spirals, and embedded in the adsorbent material. For convenience of illustration, the heating element is shown as arranged in spirals only. The resistance element is preferably tubular and extends from a point adjacent the top of the tower to a point adjacent the perforated plate 28. The ends of the heater element 30 extend through suitable insulating and packing glands 31 in the walls of the tower and project a substantial distance from the tower. Terminals 32 are clamped onto the heating element exteriorly of the tower and pass an electric current through the coil.

The upper end of the tubular heating element extends past the upper terminal and is connected to a fluid supply pipe 33 by means of a suitable insulating joint 34. A valve 35 controls flow of fluid from pipe 33 to the coil 30. The lower end of element 30 is turned downwardly at 36 and is arranged over the flared end of a discharge pipe 37. It will be seen that fluid may be passed through the coil 30 by operating valve 35, and will be discharged into pipe 37.

A suitable thermocouple 38 may extend through the walls of the tower to a point adjacent the heating coil 30 as seen in Figure 1.

In operation, the gas to be treated is passed downwardly through one of the towers until the adsorbent material has been saturated with moisture or whatever other element it is to remove from the gas stream. When this point of saturation is approached, three way valves 15 and 17 are operated to connect gas lines 14 and 16 to the other tower, and at the same time valves 20 and 23 are operated to direct wash gas through the saturated tower. In practice valves 15, 17, 20 and 23 may be interconnected to operate simultaneously. Electric power, the operating switch of which may also be interconnected to the valves to prevent inadvertent operation of the power, is then applied to terminals 32 and a current sent through the resistance element. Thermocouple 38 may then be used in the usual manner to automatically control the heating step and prevent overheating of the adsorbent material.

The adsorbed vapors are driven out of the adsorbent by the heating step and the stream of wash gas passing through the adsorbent continually disturbs the equilibrium in the adsorbent and carries away the vapors. When reactivation of the adsorbent is completed, the electric power is turned off and the wash gas is shut off. The tower may then be cooled either by natural heat loss, which is relatively slow, or by means of a cooling medium or refrigerant passed through the spiral heating pipe. The heating pipe may be made from "stainless" steel or other suitable material, to enable it to be used both for heating and cooling.

The heating element may be made sufficiently strong so as to be substantially self supporting, and thus dispense with complicated supporting means. When operated at low voltage, there will be no danger of short circuiting between adjacent turns of the coil, nor of other leakage.

To increase the rate of heat flow from the heating element to the adsorbent material, and to distribute the heat thoroughly through the adsorbent mass, radiating spines 38' of a high heat conductive metal are fastened to the spiral heating element as shown in Figures 2 and 3, and extend away from the heating element into the mass of adsorbent material. The spines are welded or brazed to the heating spiral to insure good thermal transfer, and are arranged at spaced intervals along the heating spiral, completely surrounding heating pipe 30, as seen in Figures 2 and 3. By this means heat generated in the heating element is conducted away from it into the mass of material. The heating element constructed thus takes up a minimum amount of the cross sectional area of the tower and so puts very little impedence in the way of the gas flowing through the towers. In Figure 11 is illustrated diagrammatically one method of interconnecting the main control valves and electric control switch S for simultaneous operation. The dual towers 11 of the system shown in Figure 1 are designated A and B for differentiation and are connected at top and bottom by pipes 12 and 13 as in Figure 1. In place of three way valves 15, 16, 20 and 23 we have provided a pair of four way valves 15' and 17' arranged in pipes 12 and 13 respectively. Supply pipe 14 is extended below valve 15' as pipe 14' and connects valve 15' with the valve 17'. A third four way valve 50 is arranged in pipe 14' and communicates with supply pipe 18' and discharge pipe 21' for the wash or reactivating gas. A by-pass pipe 51 connects pipe 14' above valve 50 with the gas discharge pipe 16' below valve 17'. A valve 52 of any suitable construction is arranged in by-pass 51 and a similar valve 53 is arranged in pipe 14' between four way valve 50 and by-pass 51.

It will be seen that when the four way control valves 15', 17' and 50 are in the position shown, and valve 53 is open while valve 52 is closed, wash or reactivating gas will enter four way valve 50 through pipe 18'. This gas will pass up through pipe 14' and thence through valve 15' and pipe 12 to adsorber B, down through adsorber B to pipe 13 and valve 17' and thence back to valve 50 and out through discharge pipe 21'. When it is desired to send the wash gas upwardly through the adsorber, valve 50 is rotated 90° so that gas entering through pipe 18' passes down pipe 14' to valve 17' and pipe 13 and passes upwardly through the adsorber. It is then returned through pipe 12, valve 15', pipe 14' and valve 50 to discharge pipe 21'. It will be seen therefore that valve 50 can be operated to reverse the direction of the gas through the adsorbers. The action of valve 50 is the same when valves 15' and 17' are operated to direct the gas from pipe 18' through adsorber A.

The switch S is connected by the circuit indicated at 54 to the heating coil 30 of adsorber B and by the circuit indicated at 55 to the coil of adsorber A. In the position of the switch shown in Figure 11 current is passing through coil 30 of adsorber B while the circuit to the coil of adsorber A is open. In order to prevent inadvertent movement of the switch while the adsorbers are in use, the control levers of switch S and valves 15' and 17' are interconnected by an operating link 56 so that valves 15' and 17' must necessarily act together. Furthermore, no special supports are required to hold the heating element in place and complicated insulators are therefore dispensed with. It will be seen that the spines also increase the efficiency of the cooling step as they will conduct heat to the cooling pipe.

The spines are not shown in the left hand tower of Figure 1 because the construction of the heating spiral is more readily apparent with the spines removed. These spines add greatly to the simplicity and efficiency of this apparatus both for heating and cooling. They are especially desirable because of the high heat insulating properties of the activated alumina or other adsorbent which hampers free transfer of heat.

In place of spines, fins or disks 38" such as seen in Figure 9 may be used, and these disks may be integral with the pipe or attached thereto.

While we prefer to employ electric heating of the adsorbent, it is obvious that we may substitute other heating agents. For example, heating fluid such as steam or a hot liquid, may be circulated through the heating coil to produce this result.

A single unit may be used in place of the dual unit shown in Figure 1, especially where the apparatus may be run until some necessary pause in the process, such as night time or over the week-end shutdown, because of the rapid reactivation provided by our process.

When wash gas is admitted to the tower it is cool and therefore tends to cool the adsorbent at the top of the tower which consequently will not be as completely reactivated as will the adsorbent material near the lower end of the tower. This cooling effect of the wash gas may be compensated for in several ways. In Figures 4 and 5 we have illustrated electrical heating means for preheating the gas before it reaches the adsorbent material. A pair of resistance supports 39 of suitable insulating material are secured to opposite inner walls of the tower adjacent the top thereof, and are provided with vertically extending grooves 40 extending from the top of the supports 39 to a point adjacent but spaced from the bottoms of the supports. The grooves 40 are arranged at spaced intervals in the supports and slidably receive a plurality of plate resistors 41 which rest upon the bottoms of the grooves. The resistance plates 41 are spaced apart as seen in Figure 5 and are preferably provided with slits 42 alternately communicating with opposite sides of the plates, and the plates and supports are of the type disclosed in the co-pending application of George L. Simpson, Serial No. 585,994, filed January 11, 1932. Gas entering the tower through pipes 19' and 12' must pass by the heated resistor plates, and is split into thin films and passed through the heater in intimate contact with the heated surfaces of the plate resistors. To transfer energy from a heated surface to a gas stream, the washing action of the gas as it passes over the heated surface is an important factor, and this condition is utilized to the maximum with our construction. The heating elements are placed closely together so that a thin film of gas is exposed to the heating element on both of its sides. The velocity of the gas through the relatively narrow space between the surfaces of the heating elements scours off the gas in actual contact with the heated surfaces and insures efficient and rapid transfer of heat energy from the plates to the gas streams.

The arrangement of the spaced resistor plates provides a greater surface of heating element per cubic foot of gas than do the usual heaters and consequently permits rapid transfer of large quantities of heat energy at comparatively low resistor temperatures.

It is not necessary that the gas heater be arranged within the tower. In Figures 6 and 7 we have shown the heater arranged in the gas conduit 43 leading to the adsorbent tower or to any other apparatus desired. It is obvious that our heater may be used anywhere that a heated stream of air or other gas is desired. The supports are arranged in an enlarged portion of the conduit as in the tower shown in Figure 4 with the advantage that the plates 41 may be supported from their tops as in the Simpson application referred to above.

Another method of compensating for the cooling effect of the incoming air or gas is also shown in Figure 4. The turns of the heating coil 30 may be larger and/or closer together at the top of the tower than at its lower end and therefore will produce more heat near the top of the tower where the wash gas enters. In the drawings the coils are shown as both larger and closer together adjacent the top of the tower. In Figure 4 this arrangement of the heating coils is shown as used in conjunction with the gas heating plates 41. It is obvious, however, that this arrangement of the heating coils may also be used independently of the gas heater and as a substitute therefor. The spines 38' or disks 38" are also capable of use with this form of heating element.

When the heated moisture-laden wash gases reach the cooler parts of the tower, such as the bottom of the tower, and the valves and fittings, they will precipitate a considerable amount of the moisture they carry. If the flow of heated gases is continued long enough and fast enough to heat up these parts, all of the moisture will be removed. Such a result requires considerable time and gas, however. It is very desirable to prevent this precipitation of moisture, and the taking up of this moisture by the dried gases. In Figure 4 we have shown two methods of preventing this moisture precipitation, which may be used together, as in Figure 4, or independently. In place of using a common outlet for the dried gases, and the wash gases, a dried gas outlet 44 is provided in the tower wall at a point spaced from the bottom of the tower. The wash gas outlet 45 is arranged at the bottom of the tower, and in this form of the invention the bottom of the tower converges to the centrally arranged wash gas outlet 45. A perforated plate 46 is arranged adjacent or in the mouth of the outlet 45 and supports a layer or mass of adsorbent material 47 arranged between the perforated plate 46 and the dried gas outlet 44. Wash gas passes through the adsorbent mass 47 into the outlet 45 and any precipitation of moisture will occur in the mass 47 or on the fittings below dried gas outlet 44. Dried gas will pass between the upper perforated plate 28 and the mass 47 and out of outlet 44 without passing through the mass 47 and will therefore not take up any moisture.

Another method of producing this result is to place electrical heating elements around the parts which would otherwise be sufficiently cool to cause precipitation of moisture. The electric resistance elements 48 are arranged about the metal parts at the lower end of the tower in proximity to or in contact with the metal. These heater elements extend to a point below the outlet valve, and serve to heat the metals parts and prevent precipitation of moisture.

Similar heating elements 48' may also be arranged in the dried gas outlet 44. While the heater elements 48 may be used in conjunction with the mass 47 of adsorbent material, and the independent gas outlets 44 and 45 it may also be used alone, as shown diagrammatically in Figure 10, in which the mass 47 is dispensed with, and a single outlet 49 is provided.

This method of applying heat locally to the cooler parts of the tower greatly shortens the time for reactivation. It will be understood that the layer or mass 47 of adsorbent material, and the separate gas outlets may be used independently of the heater elements 48.

In place of the heater coil 30 shown in Figure 4 in which variations in the turns of the coil are used, we may provide a heating element consisting of several sections providing separate zone control, so that the heating elements adjacent to the wash gas can be carried at a higher temperature than the heating elements farther along in the tower. This form of heater element is illustrated more or less diagrammatically in Figure 8 in which the sections 30' are arranged independently. The heating sections may be of the same size, or may vary in size, as shown. While this form of heater is illustrated as used in conjunction with the gas heater 41 it may obviously be used independently thereof, in a tower such as shown in Figure 1.

An important feature of our invention is that the gas to be dried is passed downwardly through the towers. This downward passage of gas takes advantage of the fact that the tendency of the heat of adsorption to rise will localize the heated zone. Due to the fact that as a solid adsorbent takes up moisture it rises in temperature, an upwardly moving stream of gas would move in the same direction as the rising heat of adsorption, and the adsorbent material would consequently be heated ahead of the zone where adsorption is taking place. Where the gas stream passes downwardly, however, the heat of adsorption rises upwardly away from the downwardly progressing zone of adsorption and localizes the heating.

The scavenging or wash gas is also passed downwardly, and as a consequence we obtain the advantage of gravity removal of condensation. By passing the wash gas through the tower in the same direction as that taken by the gas to be dried, the exit point of the dried gas will be the driest part of the tower, as it tends to be the hottest point of the wash gas in the reactivation step. It is highly desirable therefore, that the dried gases exit from the same end of the tower as do the wash gases.

This effect may also be obtained by reversing the flow of wash gas through the tower at intervals, but finishing so that the wash gas exits from the tower in the same direction as the dried gas exits.

Where maximum freedom from moisture is desired, a portion of the dried gas from one tower may be circulated through the other tower as a wash gas during the final stages of reactivation so as to leave the adsorbent near the exit with a minimum amount of contained moisture. Referring to Figure 11 it will be seen that by closing valve 53 and opening valve 52 dried gas from the bottom of adsorber A will pass through valve 17' to by-pass 51, through open valve 52 to pipe 14' and then through valve 15' and pipe 12 to adsorber B.

An important feature of our method is the rapid reactivation of the adsorbent material. Heat distribution by means of the embedded heating element with its spines, provision to prevent collection of moisture in the outlet piping, the thin metallic container 26 to reduce the bulk of material to be heated, and the method of forced cooling as well as the provision for separating the gas outlet from the drain outlet by a layer of dried adsorbent are all features that operate to speed up the reactivation time.

When the moisture-laden gas is passed through activated alumina, or similar adsorbents, there is an evolution of heat energy equivalent to the heat of evaporation. This will cause a material rise in temperature unless the heat of adsorption is dissipated. It has been customary in the prior art to use proportionately large quantities of the adsorbent or to avoid heat insulation so that this natural rise will not reach a point which will reduce the capacity of the adsorbent to take up moisture. Very often the amount of moisture in a gas is variable and for certain periods of time may be very low in concentration so that a relatively small amount of adsorbent would effectively remove all of the moisture. If the concentration of moisture in the gas should increase greatly, however, this small amount of adsorbent would show such a rise in temperature as to reduce or completely destroy the ability of the adsorbent to take up moisture. To overcome these difficulties our invention may be provided with forced cooling at a controlled rate. This may be readily accomplished by forcing water, air or other cooling medium through the pipe or coil 30.

It is only necessary to use this forced cooling when temperature rises in the material show that it is adsorbing moisture at a rate which prevents natural dissipation of the heat energy released. This may be easily determined by thermocouples suitably arranged, as at 38 in Figure 1. A cooling medium may be circulated to prevent the temperature rising above a predetermined point. This forced cooling allows the use of a minimum amount of adsorbent which will efficently dry gases the moisture content of which vary over a wide range.

While our invention has been described in connection with the removal of moisture from gases, it may be used to remove a gas from a mixture of gases or vapors, and for removing moisture from liquids, as in the dehydration of benzol and the drying of transformer oil or the treatment of lubricating oils. In some cases the reactivating cycle may involve washing the solid adsorbent by a solvent which may be introduced through the wash gas inlet and allowed to trickle down through the heated tower. The removal of the last traces of the solvent is accomplished by maintaining the heat and admitting the scavenger gas.

In some instances, better results may be obtained by maintaining a vacuum in the towers during reactivation.

While we have shown and described the preferred embodiment of our invention it is to be understood that various changes in the size, shape and arrangement of parts may be resorted to without departing from the spirit of our invention or the scope of the subjoined claims.

Having thus described our invention, what we claim and desire to protect by Letters Patent is:

1. A heating apparatus comprising an electrical resistance element, said resistance element having a longitudinal bore, and means to pass a cooling medium through said bore.

2. A heating apparatus comprising an electrical resistance element, said resistance element having a longitudinal bore, means to pass an electric current through said resistance element, a cooling fluid conduit, and an insulating member connecting said conduit with the resistance element and adapted to pass a cooling fluid from the conduit to the bore of the resistance element.

3. In a heating apparatus, a quantity of material to be heated and cooled, an electric heating element embedded in said material, said heating element being hollow, means to pass an electric current through said heating element to heat the material, and means to pass a cooling medium through the heating element to cool the material.

4. In a heating apparatus, a quantity of material to be heated and cooled, a hollow electrical resistance element arranged in coils and surrounded by said material, means to pass an electric current through said resistance element to heat the material, and means to pass a cooling medium through the hollow resistance element to cool the material.

5. A heating apparatus comprising a hollow electrical resistance element, high heat conductive members carried by said resistance element and radiating therefrom, means to pass an electric current through the resistance element, and means to pass a cooling medium through the resistance element.

6. A heating apparatus comprising an electrical resistance element, said resistance element having a longitudinal bore, high heat conductive members carried by said resistance element and radiating therefrom, a cooling fluid conduit, means to pass an electric current through the resistance element, and an insulating member connecting the conduit with the resistance element and adapted to pass a cooling fluid from the conduit through the bore of the resistance element.

7. In a heating apparatus, a quantity of material to be heated and cooled, a hollow electrical resistance element embedded in said material, high heat conductive members carried by said resistance element and radiating from the resistance element into said material, means to pass an electric current through the resistance element to heat the material, and means to pass a cooling medium through the resistance element to cool the material.

8. In a heating apparatus, a quantity of material to be heated and cooled, an electrical resistance element surrounded by said material, said resistance element having a longitudinal bore, high heat conductive members carried by said resistance element and radiating from the resistance element into said material, a cooling fluid conduit, means to pass an electric current through the resistance element to heat the material, and an insulating member connecting the conduit with the resistance element and adapted to pass a cooling fluid from the conduit through the bore of the resistance element to cool the material.

9. An adsorbent apparatus comprising a tower, a solid adsorbent arranged in said tower, an electric heating element embedded in said adsorbent, said heating element being hollow, and means to pass a cooling medium through said heating element.

10. An adsorbent apparatus comprising a tower, a solid adsorbent material arranged in said tower, an electric resistance element arranged in coils and embedded in said adsorbent, said resistance element being hollow, and means to pass a cooling medium through the resistance element.

11. An adsorbent apparatus comprising a tower, a solid adsorbent material arranged in said tower, and an electric resistance element arranged in coils and embedded in said adsorbent, said resistance element being hollow, whereby it is self supporting.

12. An adsorbent apparatus comprising a tower, an adsorbent material arranged in said tower, means to admit fluid to said tower, and a heating element embedded in said adsorbent material and distributed therethrough, the largest portion of said heating element being arranged in the portion of the adsorbent adjacent the point where fluid enters the tower.

13. An adsorbent apparatus comprising a tower, an adsorbent material arranged in said tower, means to admit fluid to said tower, and a heating element embedded in said adsorbent material and distributed therethrough, said heating element being arranged to produce a greater amount of heat adjacent the point where the fluid enters the tower than in other portions of the tower.

14. An adsorbent apparatus comprising a tower having a gas inlet end and a gas outlet end, an adsorbent material arranged in said tower, means to pass a gas through said tower and adsorbent material from the gas inlet to the gas outlet, and an electric resistance element embedded in said adsorbent material, there being a greater portion of the resistance element adjacent the gas inlet end of the tower than in other portions of the tower.

15. An adsorbent apparatus comprising a tower having a gas inlet end and a gas outlet end, an adsorbent material arranged in said tower, an electric resistance element embedded in said adsorbent material, there being a greater portion of the resistance element adjacent the gas inlet end of the tower than in other portions of the tower, and means to maintain the temperature of said adsorbent material below a predetermined value.

16. An adsorbent apparatus comprising a tower having a gas inlet end and a gas outlet end, an adsorbent material arranged in said tower, an electric resistance element embedded in said adsorbent material, there being a greater portion of the resistance element adjacent the gas inlet end of the tower than in other portions of the tower, said resistance element being hollow, and means to pass a cooling medium through said resistance element.

17. An adsorbent apparatus comprising a tower, an adsorbent material arranged in said tower, a heating element embedded in said adsorbent material, high heat conductive members radiating from said heating element into said adsorbent material, said heating element comprising a hollow electrical resistance member, and means to pass a cooling medium through said resistance member.

18. In an adsorbent apparatus, a tower, an adsorbent material, means to pass a fluid through said tower and adsorbent material and a heating element embedded in said adsorbent material, said heating element being divided into a plurality of independent sections whereby the temperature in different parts of said tower may be independently controlled and regulated, said heating sections comprising electrical resistance elements.

19. In an adsorbent apparatus, a tower having a fluid inlet and spaced fluid outlets, an adsorbent material arranged in said tower between the inlet and outlets, means to heat the adsorbent material, a layer of adsorbent material arranged in said tower between the fluid outlets, and means to heat one of said outlets.

20. In an adsorbent apparatus, a tower adapted to receive a mass of adsorbent material, said tower comprising a metallic casing lined with refractory material, and a relatively thin metallic container arranged within said lining and in contact with the adsorbent material, said container having a bleeder port in one of its walls whereby pressure within the container will be balanced by pressure outside of the container.

21. In an adsorbent apparatus, a tower having a fluid inlet and spaced fluid outlets, a mass of adsorbent material arranged in the tower between the inlet and outlets, a layer of adsorbent material arranged in said tower between the fluid outlets, means to pass a fluid to be dried from said inlet through the mass of adsorbent material to one of said fluid outlets, means to heat the mass of adsorbent material, and means to pass a wash fluid from said inlet through the heated mass of adsorbent material and through the layer of adsorbent material to the other fluid outlet.

WILLIAM E. MOORE.
GEORGE L. SIMPSON.